United States Patent
Ziebart et al.

(10) Patent No.: US 7,215,870 B2
(45) Date of Patent: May 8, 2007

(54) MOISTURE PROTECTION FOR AN ELECTROMECHANICAL TRANSDUCER

(75) Inventors: Volker Ziebart, Schlatt (CH); Jean-Maurice Tellenbach, Hettlingen (CH)

(73) Assignee: Mettler-Toledo AG, Greifensee (CH)

( * ) Notice: Subject to any disclaimer, the term of this patent is extended or adjusted under 35 U.S.C. 154(b) by 42 days.

(21) Appl. No.: 11/051,628

(22) Filed: Jan. 27, 2005

(65) Prior Publication Data
US 2005/0163461 A1    Jul. 28, 2005

(30) Foreign Application Priority Data
Jan. 27, 2004  (EP) ................... 04075199

(51) Int. Cl.
*G02B 6/00* (2006.01)
(52) U.S. Cl. ...................................... 385/147
(58) Field of Classification Search ............... 385/147; 338/2, 3, 5
See application file for complete search history.

(56) References Cited

U.S. PATENT DOCUMENTS

| | | | | |
|---|---|---|---|---|
| 2,363,181 A * | 11/1944 | Howland | ................... | 338/2 |
| 3,639,875 A * | 2/1972 | Brewer | ................... | 338/2 |
| 3,863,192 A * | 1/1975 | Grey | ................... | 338/2 |
| 4,104,605 A * | 8/1978 | Boudreaux et al. | ................... | 338/2 |
| 4,432,247 A * | 2/1984 | Takeno et al. | ................... | 73/862.623 |
| 5,052,505 A * | 10/1991 | Naito et al. | ................... | 177/229 |
| 5,400,489 A * | 3/1995 | Hegner et al. | ................... | 29/25.41 |
| 5,404,124 A * | 4/1995 | Ruppin et al. | ................... | 338/2 |
| 5,631,622 A * | 5/1997 | Hauber et al. | ................... | 338/2 |
| 5,790,304 A * | 8/1998 | Sanders et al. | ................... | 359/361 |
| 6,004,484 A * | 12/1999 | Faris et al. | ................... | 252/500 |
| 6,830,817 B2 * | 12/2004 | Stachowiak | ................... | 428/432 |
| 2001/0042554 A1 * | 11/2001 | Tamura | ................... | 134/1.1 |

FOREIGN PATENT DOCUMENTS

| | | |
|---|---|---|
| EP | 1 384 980 | 1/2004 |
| JP | 60 227140 | 11/1985 |
| JP | 01 212327 | 8/1989 |
| WO | 2004/011892 | 2/2004 |

* cited by examiner

*Primary Examiner*—Ellen E. Kim
(74) *Attorney, Agent, or Firm*—Buchanan Ingersoll & Rooney PC

(57) ABSTRACT

A strain gauge with a strain-sensitive electrical resistor track and connector electrodes for contacting the resistor track arranged on a carrier substrate is provided with a protective coating having inorganic materials and covering at least part of the carrier substrate and/or of the resistor track and/or of the connector electrodes. The build-up structure of the protective coating over the range of the coating thickness is inhomogeneous, and the protective coating is underlaid with a surface-smoothing polymer layer which evens out rough surface portions of the area to be coated. The layer thickness of the surface-smoothing layer is at least equal to the thickness of the protective coating. A strain gauge of this type can be used in a force-measuring cell, where the surface-smoothing layer and the protective coating can be deposited after an uncoated strain gauge has been installed on the deformable body of the force-measuring cell.

21 Claims, 3 Drawing Sheets

MOISTURE PROTECTION FOR AN ELECTROMECHANICAL TRANSDUCER

RELATED APPLICATIONS

This application claims benefit to European Priority Patent Application Serial Number 04 075 199.2, filed Jan. 27, 2004. This priority application is hereby incorporated by reference in its entirety.

BACKGROUND

1. Field

A strain gauge is disclosed which has a strain-sensitive electrical resistor track arranged on a carrier substrate and connector electrodes for contacting the resistor track, wherein the strain gauge is provided with a protective coating of inorganic materials. An array of strain gauges is also disclosed that are arranged in a row or over an area, wherein the strain gauges have a strain-sensitive electrical resistor track arranged on a carrier substrate and a coating of inorganic materials covering the resistor track and at least part of the carrier substrate. A force-measuring cell with a deformable body and with at least one strain gauge arranged on the deformable body is also disclosed, as is a method of producing a protective coating on a strain gauge or on single-row array or two-dimensional array of strain gauges, or on a force-measuring cell equipped with a strain gauge.

2. Background Information

A strain gauge has a metallic resistor track arranged on a carrier substrate which can be made in the shape of a meandering structure by a known chemical etching method. Also arranged on the carrier substrate are connector electrodes for contacting the resistor track. The connector electrodes are often made in one work operation together with the resistor track, and they consist therefore in most cases of the same material. Electrically insulating materials are used for the carrier substrates of strain gauges. Depending on the area of application, one finds carrier substrates of glass, ceramic materials, in many cases polymers, glass-fiber reinforced polymers, or composite materials. Strain gauges are measuring elements in which a mechanical deformation causes a change of the electrical resistance and which are therefore used for the measurement of the force that produces the deformation.

In the field of weighing technology, to name an example, a force acting on a deformable body causes a deformation which is converted into an electrical signal by means of strain gauges. In a force-measuring cell that functions according to this principle, a force caused by a load acting on the load receiver or—for example in a weighing application—acting on the weighing pan which is connected to the load receiver produces a displacement of the vertically movable load-receiving part in relation to the spatially fixed part of the deformable body. In an exemplary embodiment, the deformable bodies used in force-measuring cells have four elastic bending zones formed by thin material portions which are located at the four corners of a parallelogram, so that the load-receiving part is arranged as a vertically movable leg of the parallelogram opposite a fixed, likewise vertical parallelogram leg that is preferably fastened to a housing. The magnitude of the deformation that occurs in the thin bending zones is measured as an electrical resistance change by means of at least one strain gauge that is installed on one of the bending zones, in most cases by an electrically insulating adhesive layer.

Because of their elastic properties, polymer substrate materials are an exemplary choice for strain gauges used in the field of weighing technology, in particular polyimides, but also epoxides, phenolic resins, melamines and ketones. Polymer carrier substrates have the advantage of a lower rigidity, so that their shape can conform more easily to the deformable body. This reduces in particular the mechanical stress in the adhesive layer. Hysteresis effects or a destruction of the adhesive layer that can occur when a rigid substrate is bonded to a deformable body are found far less often with polymer substrates. Furthermore, polymer substrates of strain gauges with a meander-patterned resistor track offer the possibility of compensating a drift in the load signal through the known method of designing the return loops of the resistor track with an appropriately selected shape. Besides, strain gauges with polymer carrier substrates are easier to handle and more cost-effective to produce.

However, polymers have the disadvantage of a relatively high absorptiveness for water and also for solvents, so that the humidity of the ambient air surrounding the load cell, and more particularly a change in the relative humidity, has a lasting influence on the measuring result. For example the sensitivity, the stability of the zero point and the creep properties, the so-called load drift, are parameters that are influenced by water- and solvent-related moisture content in a force-measuring cell in which strain gauges are used as transducer elements. In measurements where the humidity of the ambient air surrounding a force-measuring cell was increased in one step from about 30% r.H. to 85% r.H. in the typical temperature range between 10° C. and 40° C., the change in this ambient parameter was found to cause a change in the weighing result of the order of some ten to a few hundred ppm (parts per million) of full span (full-load signal).

Some of the causes for the changes in the weighing results are understood and can be explained in physical terms. For one, the substrate material of an unprotected strain gauge absorbs the moisture and therefore swells up, whereby the distance of the resistor track from the bending zone is increased and the deformation that is imparted by the bending zone on the resistor track is changed by a small amount. As a second factor, the absorbed moisture changes the elastic properties of the substrate material and thereby changes the deformation parameters of the resistor track. As a third factor, an increased moisture content of the substrate material can cause leakage currents between neighboring parts of a meander-shaped resistor track or even between the resistor track and the metallic deformable body. While these effects are small in relation to the full-span signal, as shown by the aforementioned measurements, their influence on the measuring signal of a force-measuring cell that has to meet the highest accuracy requirements is nevertheless still unacceptably large. Protective devices and/or protective measures are therefore necessary in order to obtain a measuring signal that remains largely unaffected by conditions of the ambient environment, in particular by moisture acting on the substrate material and/or on the resistor track.

The known state of the art offers measures for the protection of strain gauges from moisture that causes a change in the measuring signal. For example DE 27 28 916 A1 describes the covering of a strain gauge installed on a measuring transducer. First, an electrically insulating layer is applied, for example a resin, or the strain gauge is embedded in this layer so that a part of the transducer body that surrounds the strain gauge is likewise covered. A metallic layer is arranged on top of the electrically insulating layer and likewise covers a part of the transducer body around the strain gauge. Thus, a strain gauge that is already installed on a transducer can be encapsulated against humidity.

A concept for protecting strain gauges against moisture is disclosed in U.S. Pat. No. 5,631,622, where an electrically insulating polymer coating is applied to the strain gauges and a metal foil is laminated onto the coating as an additional covering after a quantity of strain gauges have been produced in the form of an array on a sheet and before the sheet has been cut apart into the individual strain gauges. After the separating step, the metal foil still provides a large-area protective covering against humidity for each individual strain gauge.

For protecting a strain gauge against corrosion and to improve the measuring properties, it is proposed in JP 7 113 697 A to stop moisture from entering by applying a thin inorganic film, for example $SiO_2$ with a thickness of about 100 nanometers (nm), to the surface of the strain gauge as a barrier against moisture penetration. Subsequently, an inorganic insulating film, for example polyimide with a thickness of about 10 micrometers ($\mu$m) is applied which serves to plug microscopically small holes or breaks in the inorganic film, so-called pinholes, through which moisture could still penetrate. The protection achieved by this dual-layer covering is not always satisfactory, in particular in highly sensitive force-measuring cells that are designed for relatively small loads.

A force transducer with strain gauges is disclosed in DE 40 15 666 C2, wherein a vapor-deposited diffusion-tight electrically insulating coating of silicon oxide or silicon carbide, preferably two to four micrometers thick, is applied to a strain gauge and the adjacent portion of the carrier substrate. Another embodiment can also have a coating of a silicon oxide layer as a base which is overlaid with a metallic layer, such as a layer of nickel.

The solutions of the foregoing description suffer from the problem that the protective coatings or protective foils which form a blanket cover over the strain gauge, in particular the inorganic coatings or foils with a strong barrier effect, have a comparatively large mass and a high degree of stiffness so that they, too, cause a change in the measuring result produced by the strain gauge. This problem exists regardless of whether the protective coverings are applied directly to the strain gauge that is already installed on the measuring transducer or whether a covering is applied to a large number of strain gauges that have been produced together on one sheet. The measurement errors are caused by so-called bypass forces that are caused by overlaying the strain gauge with a relatively thick coating or foil of the order of several microns as disclosed in the state-of-the-art references. Metal coverings or foils in particular, because of their comparatively high stiffness even if they are only a few microns ($\mu$m) thick, contribute measurably to a force bypass. A force bypass occurs for example as a result of thick inorganic protective coatings as they have a high stiffness of their own and thus contribute significantly to the overall stiffness of the aforementioned bending zones of the deformable body. This problem is particularly pronounced in force-measuring cells for the measurement of small forces, because the bending zones are in this case very thin in order to provide a high sensitivity. Consequently, undesirable changes of the elastic properties of the protective covering, such as for example an elastic after-effect (also known as creep), a high inelastic component, in particular a strain hysteresis, cause a measurement error that is not reproducible and therefore not amenable to software-based compensation techniques.

On the other hand, there is no question that passages for moisture that can occur particularly in very thin moisture barrier coverings—microscopically small pores or breaks that are also referred to as pinholes—as described in JP 7 113 697 A, need to be prevented or that at least their effects need to be reduced to the largest extent possible.

The disclosures of all of the aforementioned documents are hereby incorporated by reference in their entireties.

SUMMARY

A strain gauge is disclosed that is or can be installed on a deformable body of a force-measuring cell, wherein a protective coating is provided which on the one hand prevents moisture from entering and on the other hand avoids or at least significantly reduces bypass forces.

A strain gauge which has a strain-sensitive electrical resistor track arranged on a carrier substrate and connector electrodes for contacting the resistor track is provided with a protective coating including, or consisting of, inorganic materials covering at least part of the carrier substrate and/or of the resistor track and/or of the connector electrodes. The build-up structure of the protective coating over the range of the coating thickness is inhomogeneous, and between the strain gauge and the protective coating there is a surface-smoothing polymer layer, which evens out rough surface portions of the area to be coated. The layer thickness of the surface-smoothing layer is at least equal to the thickness of the protective coating.

The excellent barrier properties that are found in the inorganic materials are exploited and, by using very thin barrier coatings, a reduction of the very high stiffness associated with the thick inorganic coatings that are known from the existing state of the art is achieved. In order to avoid the aforementioned bypass forces, a coating thickness is selected primarily in the sub-micron range, because the inorganic materials, as is commonly known, have a modulus of elasticity that is larger by a factor of 10 to 100 than the elastic modulus of polymer materials of the kind that are used, e.g., for the carrier substrate. With a low thickness, it is possible to reduce the stiffness of the protective layer which, as is commonly known, depends on the elastic modulus of a material and on the thickness of a coating made of the material.

This constraint on the thickness is not applicable to the same extent for the underlying surface-smoothing layer which is arranged under the protective coating and which includes, or consists of, an electrical insulating polymer and in particular of an acrylate polymer or an inorganic-organic hybrid polymer. (The latter materials are described in DE 38 28 098 A1 and DE 43 03 570 A1, both of which are incorporated by reference in their entireties). The surface-smoothing layer performs the function of evening out the rough areas of the surfaces of the carrier substrate and the resistor track as well as rounding the edges and reducing the flank steepness of the resistor track. Since the elastically soft polymer layers contribute less to a force bypass than would be the case for an inorganic protective coating of the same thickness, there is no problem in selecting a larger thickness for the underlying surface-smoothing layer than for the protective coating. In the interest of an economical use of materials, the thickness of the surface smoothing layer can however be limited to an amount that is consistent with achieving a desired degree of flatness. However, the layer thickness at which the desired flattening effect is achieved differs depending on the polymer material being used. A layer thickness between one and three microns will as a rule yield satisfactory results, but in special cases the layer thickness can also lie in the sub-micron range. Lastly, the thickness of the surface-smoothing layer also depends on the protective coating that is to be deposited on it. Particularly for strain gauges that are to be used in load cells of high sensitivity for a low load range, the overall thickness of the protective coating should be in the sub-micron range.

In addition to smoothing out the underlying base surfaces in particular with regard to rough areas in the surface of the strain gauge, the surface-smoothing polymer layer, specifically the inorganic-organic hybrid polymer layer has proven to be adhesion-enhancing in regard to the following layers, so that no delamination of the protective coating occurs. Furthermore, the surface-smoothing layer, for example a layer of an inorganic-organic hybrid polymer, is easy to apply, for example with brushes, rollers, by spraying, or by means of a tampon-printing method. The same can also be said for an acrylate polymer layer.

The composition of the surface-smoothing polymer layer can be homogenous over the range of the layer thickness.

It is an exemplary property of the protective coating, specifically of individual layers of the latter, that the coating in the process of being deposited, particularly by PECVD (plasma-enhanced chemical vapor deposition), grows in a conformal way on the underlying surface, i.e., as a so-called conformal coating. This means that the surface receives a coverage of substantially constant thickness, independent of the angles at which individual surface locations are oriented in relation to the overall orientation of the deposition surface (plane of deposition). In other words, even overhanging portions or portions that substantially extend at a right angle to the deposition plane, for example the lateral flanks of the resistor track, are covered by the protective coating. In combination with the surface-smoothing polymer layer as an underlying base, an optimum of protection is achieved against the penetration of moisture. The polymer layer used as an undercoating under the protective coating has the effect of smoothing rough surface areas and rounding out edges where an inorganic protective coating has a particular tendency to develop the aforementioned micro-pores or micro-breaks, or hairline breaks that occur as a result of locally concentrated stresses, particularly thermal stresses, and where also on the other hand a tendency exists for micro-pores or micro-breaks to attach themselves. Thus, the occurrence of micro-pores or micro-fractures in the protective coating is a priori reduced, and while the edges still have a degree of steepness, they are not excluded from coverage by the protective coating, due to the conformance of coating to the underlying surface. Thus, the surface area of the strain gauge is covered completely and uniformly by the protective coating, and there are no weak spots where moisture could enter. In addition to the aforementioned complete coverage of the resistor track, the absence of weak spots is also of advantage in cases where the strain gauge is applied to a force-measuring cell and subsequently coated, or in a single-row array or a two-dimensional array of strain gauges in which the border surfaces of the carrier substrate are already substantially exposed by slits which were cut in the array to allow the border surfaces to be covered in the coating process.

An increase in the thickness of an inorganic protective coating does not necessarily result in an increased barrier effect against the penetration of moisture, which in the context of the invention should generally be understood as a protective effect not only against the entry of water but also against solvents and/or gases. Once micro-pores or micro-fractures are open, they have a tendency to propagate themselves through the entire thickness of a predominantly homogeneous inorganic coating.

It is therefore a useful and sensible practice to provide the protective layer with an inhomogeneous configuration. With a suitable selection of the materials that are to be combined in an inhomogeneous arrangement in the protective coating, and most of all through a suitable variation of the coating parameters, the open channels in the form of micro-pores or micro-fractures can be closed.

In a particular embodiment, the protective coating is a multilayered coating with an alternating sequence of layers of different inorganic materials, and/or an alternating sequence of different stoichiometric compositions of an inorganic material comprising, or consisting of, at least two components, and/or an alternating sequence of variations in structural parameters of an inorganic material.

The protective coating can in particular be configured with a sequence of silicon oxide layers and silicon nitride layers. Protective coatings of this type are disclosed in WO 03/050894 as a means for covering electronic devices, in particular indicating devices such as light-emitting devices or liquid crystal displays.

In another exemplary embodiment, a protective layer is configured with a continuous variation of one or more parameters, including in particular the chemical composition of the coating material, over the range of the coating thickness.

This continuous variation can occur on the one hand in multilayered coatings as a soft transition between the individual layers, i.e., the coating parameters are not changing abruptly, but their profile is a continuous periodic function, rather resembling a sine function. On the other hand, the inhomogeneity can occur in a continuous transition over the entire thickness of the coating, as a gradient of one or more of the coating material parameters. This version of a continuous variation is, for example, advantageous for producing extremely thin protective coatings that are used on strain gauges for force-measuring devices of high sensitivity and a low load capacity.

In a method that can be given as an example for producing a coating with at least one continuously varying parameter, the source changes its material composition during the deposition process, or the coating is deposited from two sources whose deposition rates vary, i.e., the rate from one source increases as a function of time while the rate from the other source decreases, and/or vice versa.

An advantage of an inhomogeneous protective coating with a continuous variation of one or more parameters, whether the continuous variation has the form of a gradient or of continuous transitions between the layers of a multilayered coating, lies in a further reduction of internal stresses which could otherwise occur if layers with strongly different parameters followed each other abruptly in a multilayered coating, where the risk of a delamination of individual layers would not in all cases be excluded.

Accordingly, an advantage of a protective coating with a continuous variation of a parameter lies in a reduced risk of delamination. In contrast, an advantage of a multilayered coating with abrupt transitions between the layers lies in the fact that if a first layer, e.g., a barrier layer, is followed immediately by a second layer, e.g., an intermediate layer, with parameters different from the first layer, the micro-pores and micro-breaks of the first layer are almost completely covered, whereby an improved barrier effect is achieved.

In this context, it should be pointed out that the inorganic protective layers are deposited at relatively low temperatures, between about 80° C. and 130° C., for example by means of chemical vapor deposition, for example PECVD (plasma-enhanced chemical vapor deposition), because the carrier material of the strain gauge as well as the surface-smoothing layer can be affected as little as possible. As a consequence, the structure of these protective coatings can deviate from a strict crystallinity and in particular with inorganic insulating materials, the protective coating grows in an amorphous form.

To describe the way in which a strain gauge according to an exemplary embodiment is used, a force-measuring cell with a deformable body has at least one strain gauge installed on the deformable body, with a strain-sensitive electrical resistor arranged on a carrier substrate of the strain gauge. As a protective measure against the penetration of moisture, a part of the protective coating and of the surface-smoothing polymer undercoating layer extend beyond the at least one strain gauge and covers at least a part of the deformable body, in particular the surface portions of the deformable body that border on the strain gauge. The protective coating is built up inhomogeneously over the range of its thickness. The surface-smoothing polymer layer includes, or consists in particular of, an acrylate polymer or an inorganic-organic hybrid polymer. The layer thickness of this surface-smoothing layer can match at least the thickness of the inhomogeneous inorganic protective layer.

In an advantageous embodiment, the strain gauge with an inhomogeneous inorganic protective coating and an underlying surface-smoothing polymer layer is covered with a cover layer of a polymer material or of silicone on top of the inorganic protective coating. Since silicone is especially soft, it does not present a problem in regard to the force bypass that has been discussed hereinabove.

In accordance with an exemplary embodiment, a method of producing a protective coating on an individual strain gauge or on a single-row array or two-dimensional array of strain gauges includes the steps of depositing a surface-smoothing polymer layer on at least a part of the carrier substrate and/or the resistor track and/or the connector electrodes, and depositing a thin inorganic protective coating on the surface-smoothing polymer layer, wherein the deposition process parameters are varied in such a way that an inorganic protective coating is formed which is inhomogeneous over the coating thickness.

The tampon-printing process is an exemplary method of applying the surface-smoothing polymer layer. The protective coating is advantageously produced by the method of chemical vapor deposition (CVD), in particular plasma-enhanced chemical vapor deposition (PECVD).

In a particularly advantageous embodiment, the surface of the strain gauge and/or the surface-smoothing polymer layer is pretreated prior to the deposition process by means of chemical or physical cleaning methods, in particular by means of plasma cleaning methods.

In accordance with exemplary embodiments, a method of producing a protective coating on a force-measuring cell with a deformable body on which at least one strain gauge is installed includes the steps of depositing a surface-smoothing polymer layer on at least a part of the carrier substrate and/or the resistor track and on the deformable body, and depositing a thin inorganic protective coating on the polymer layer, wherein the deposition process parameters are varied in such a way that an inorganic protective coating is formed which is inhomogeneous over the coating thickness.

This kind of coating process of a strain gauge can be performed by the aforementioned methods, such as on a strain gauge that is already installed on the force measuring cell.

BRIEF DESCRIPTION OF THE DRAWINGS

The invention will be explained hereinafter in further detail with reference to the drawings which are of a strongly schematic character, wherein.

DETAILED DESCRIPTION

Figure 1:
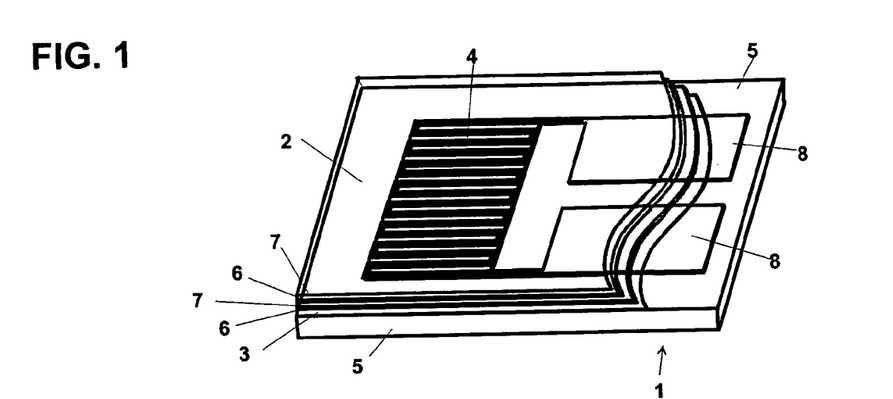
FIG. 1 represents a three-dimensional view of an exemplary individual strain gauge with a protective coating in the form of a multilayered coating which is underlaid with a surface-smoothing layer.

FIG. 1 is a three-dimensional illustration of an exemplary individual strain gauge 1 that is provided with a protective coating in the form of a multilayered coating 2 against the penetration of moisture, particularly of water vapors and solvent vapors, but also gases such as oxygen. The strain gauge 1 has a strain-sensitive resistor track 4 which is arranged, for example, in a meandering shape on a carrier substrate 5 and joined to connector electrodes 8. The strain gauge 1 was, for example, cut from a two-dimensional array of strain gauges after the coating process had been completed. For the sake of clarity, the multilayered coating 2, which includes, or consists of, a regular sequence of layers 6, 7, is shown transparent and broken open on one side. The layers 6, 7 of the multilayered protective coating 2 are of different inorganic materials or of different stoichiometric compositions of an inorganic material including, or consisting of, at least two components, or they have an alternating sequence of variations in structural parameters of an inorganic material. The thickness of the individual layers 6, 7 can be in the range from, for example, 5 to 200 nm, depending on the deposition process. In individual cases, particularly if the strain gauge 1 is used for force-measuring cells of higher capacity, or if the coating material has a low modulus of elasticity, the layers can also have a thickness of up to 500 nm.

The multilayered coating is underlaid with a surface-smoothing layer 3 of a polymer, for example an acrylate or methacrylate polymer layer. A layer 3 of this type smoothes the surface of the strain gauge 1, particularly in the area of the edges, for example at the edges of the resistor track 4, whereby the steepness of their flanks is reduced. Furthermore, the undercoating layer 3 covers irregularities of the surface or even faults or contaminating particles, be it on the resistor track 4 or the carrier substrate 5, and smoothes them over. The surface-smoothing polymer layer 3 reduces in particular the probability that micro-pores or hairline breaks will either originate or continue in an inorganic protective coating 2 that is deposited on top of the surface-smoothing layer 3. As a result, the conditions are favorable for a multilayered inorganic protective coating 2 with good sealing properties to be formed on the surface-smoothing layer 3.

Another class of materials that can be used for the surface-smoothing polymer layer 3 are the inorganic-organic hybrid polymers, for example with the trade name "ORMOCER". These materials which are described in DE 38 28 098 A1 and DE 43 03 570 A1, both of which disclosures are hereby incorporated by reference in their entireties, have a good elasticity and even a certain barrier effect against moisture penetration. However, the barrier effect is not effective enough for these materials to be suitable as a protective coating for strain gauges, especially strain gauges for force-measuring devices. The inorganic-organic hybrid polymers materials have the special advantage that they can be applied in an air atmosphere, for example by spraying, centrifugation, or a tampon-print method.

In order to obtain on the one hand enough of a flattening and smoothing effect while on the other hand avoiding an associated—albeit small—force bypass as much as possible, it is advantageous to apply the surface-smoothing polymer layer 3 with a layer thickness of about one to three microns, where at last the layer thickness depends on the materials being used and thus can also be in the submicron range in individual cases. In order to achieve a sufficient smoothing effect, however, the thickness of the surface-smoothing polymer layer 3 will at least match the overall thickness of the protective coating 2. The material composition of the surface-smoothing polymer layer 3 can be homogeneous over the layer thickness.

Exemplary materials for the layers 6, 7 of the multilayered protective coating 2—if the layers 6, 7 consist of different inorganic materials—are inorganic insulating materials, for example a sequence of thin layers of silicon nitride and silicon oxide, wherein the sequence of 100 to 200 nm of silicon nitride (first layer 6), 100 nm of silicon oxide (second layer 7), 100 nm of silicon nitride (again first layer 6), an optional 100 nm of silicon oxide (another second layer 7), and an optional 100 nm of silicon nitride (another first layer 6) represents an exemplary arrangement, because the silicon nitride in particular is highly effective as a barrier against the penetration of moisture. The silicon oxide layer, although this material can likewise by credited with a barrier property, has the primary function within the multilayered coating to close off the possibly occurring micro-pores or hairline breaks in the silicon nitride layer. A multilayered coating 2 includes, or consists of, at least three layers, such as five layers, of inorganic materials.

The layers 6, 7 of the multilayered protective coating 2 can also be composed of an inorganic material including, or consisting of, at least two components, wherein the stoichiometric ratio of the components changes from one layer to the next. As an example of materials suitable for multilayered coatings 2 with an alternating sequence of layers 6, 7 of different stoichiometric composition, one could name silicon oxynitrides with the respective contents of oxide and nitride varying from one layer to the next.

Figure 2:
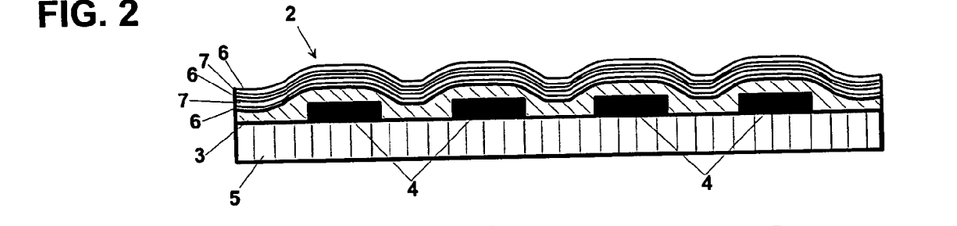
FIG. 2 represents a sectional view of an exemplary individual strain gauge with a protective coating in the form of a multilayered coating which is underlaid with a surface-smoothing layer.

The arrangement and the exemplary sequence of the individual layers in the multilayered coating 2 is illustrated in FIG. 2, showing a sectional view of a strain gauge 1 to which a multilayered coating 2 including, or consisting of, a total of five thin individual layers 6, 7 has been applied. However, the drawing is very much of a schematic character, and the respective thicknesses of the carrier substrate 5, the resistor track 4, the surface-smoothing polymer layer 3 which is arranged between the multilayered protective coating 2 and the strain gauge 1, and the individual layers 6, 7 of the protective coating are not drawn to scale.

A multilayered coating 2 can include, or consist of, a regular sequence of individual layers 6, 7, which may for example be of equal thickness, or the coating can consist of an irregular sequence of such layers. In the latter case, there is a larger variety of choices in regard to the materials that can be used: the layer thickness, the stoichiometry and/or the structure of the individual layers. An exemplary choice, however, includes, or consists of, a regular sequence of layers, in particular of silicon nitride alternating with silicon oxide as mentioned above, where the thickness of individual layers is about 100 nm and the overall thickness of the multilayered coating will, as a rule, not exceed one micron.

Figure 3:
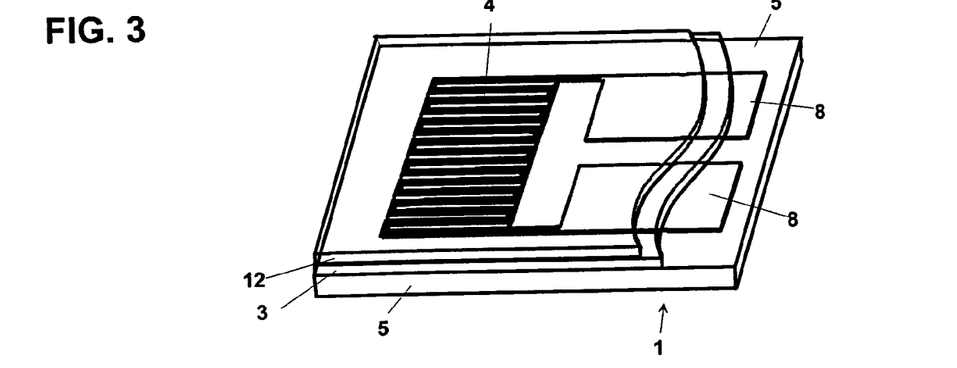
FIG. 3 represents a three-dimensional view of an exemplary individual strain gauge with a protective coating in the form of a single inhomogeneous layer which is underlaid with a surface-smoothing layer.

FIG. 3 gives a three-dimensional view of an individual strain gauge 1 which was first provided with a surface-smoothing polymer layer 3 of the type that was described above in the context of FIGS. 1 and 2. The surface-smoothing layer is followed by an inorganic protective coating 12 in the form of a gradient layer that is distinguished by an inhomogeneity with a continuous increase or decrease of at least one parameter over the layer thickness, for example a parameter associated with the material composition or material structure.

An example that can be named for the inhomogeneous material composition of a protective coating 12 with a gradient layer includes, or consists of, a silicon oxynitride layer deposited by means of PECVD, wherein a high proportion of nitride or even a zone of pure silicon nitride exists near the surface-smoothing layer. Proceeding through the thickness of the layer, the proportion of oxide increases at the expense of the nitride content until a zone of pure silicon oxide or at least a silicon oxynitride zone with a high proportion of oxide is reached near the boundary surface to the ambient space. The manufacturing process for a silicon oxynitride layer of this type will be explained hereinafter through an example.

A protective coating 12 with a continuous change in its structural parameters can be built up in a similar manner, as a structural adaptation goes in many cases together with a change in the composition. As another possible way to achieve a change of structural parameters over the layer thickness, for example the granularity of polycrystalline layers unless they grow up with an amorphous consistency, the deposition parameter can be varied, be it by varying the temperature of the source, of the substrate, of the deposition chamber as a whole, or the deposition rate.

Figure 4:
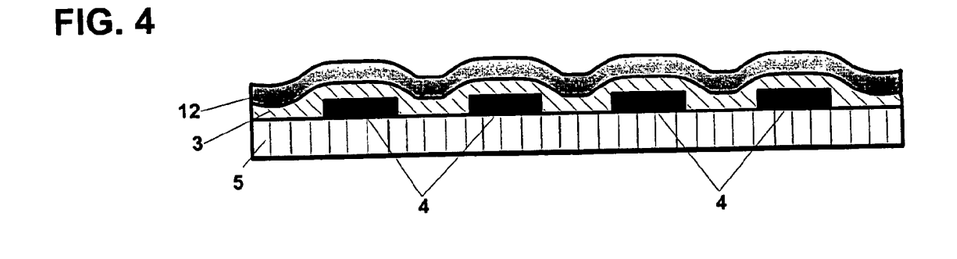
FIG. 4 represents a sectional view of an exemplary individual strain gauge with a protective coating in the form of a single inhomogeneous layer which is underlaid with a surface-smoothing layer.

FIG. 4 represents a sectional view of the same strain gauge 1 with the protective coating 12 as shown in FIG. 3, where the inhomogeneity or the gradient of a parameter is symbolically indicated by a graduated gray tone.

In cases where harsh mechanical wear conditions are expected, it can be useful to overlay a protective coating 2, 12 that has multiple layers or a continuous variation of one or more parameters with a cover layer (not shown) which shields the protective coating 2, 12 against possible extraneous mechanical influences, for example in the form of scratches and at the same time stabilizes the protective coating 2, 12. Silicone has proven to be suitable for a cover layer of this kind. A silicone layer with a thickness of several microns presents no problem, because silicone is very soft and will therefore not contribute to a force bypass.

The material for the protective coatings 2, 12 can be selected from a multitude of the known inorganic insulating materials that can be applied by different deposition processes. Examples to be mentioned here are oxides, nitrides, fluorides, carbides, borides, or combinations thereof, in particular oxynitrides, or also ceramic mixtures. For example silicon oxide, titanium oxide, chromium oxide, aluminum oxide, silicon nitride and titanium nitride have proven to be suitable materials. Layers of so-called "diamond-like carbon" can likewise be used as protective coatings 2, 12. Because of their excellent barrier properties it is particularly advantageous to use silicon nitride layers for the inorganic protective coatings and to alternate them with oxide layers, for example silicon oxide, titanium oxide, tantalum oxide, zirconium oxide, hafnium oxide, aluminum oxide, or layers of fluoride, for example titanium fluoride, or mixtures of these materials.

Other materials that could be used for the protective coatings 2, 12 also include in particular metals, for example silver, aluminum, gold, chromium, copper, nickel, titanium, as well as alloys, for example nickel-cobalt alloys, or intermetallic compounds, for example of aluminum and copper, of tungsten and copper, or of titanium and aluminum. However, there is a lower degree of preference of metallic layers as protective coatings because of the greater expense and complexity of the deposition processes. Also, the risk of a short-circuit connection to the resistor track cannot be completely excluded.

According to an exemplary embodiment, an inorganic protective coating, for example a multilayered coating 2 or a gradient coating 12 with a continuous variation of a parameter, can be applied to a strain gauge 1 after the production process of the strain gauges 1 has been completed but while they are still hanging together in a single-row array or a two-dimensional array. However, when the arrays are cut apart into individual strain gauges 1, the edge surfaces of the carrier foil in particular remain open and accessible to the penetration of moisture. Nevertheless, with the large surface ratio between the top side and the lateral edge surfaces of a strain gauge, the protection provided by the inorganic protective coating 2, 12 is still considerable. If a strain gauge 1 has to meet more stringent requirements, for example in a force-measuring cell of high sensitivity, one could also put an all-around coating on an individual strain gauge 1, whereby the edge surfaces of the carrier substrate 5 would be covered, at least with careful handling.

Figures 5, 6:
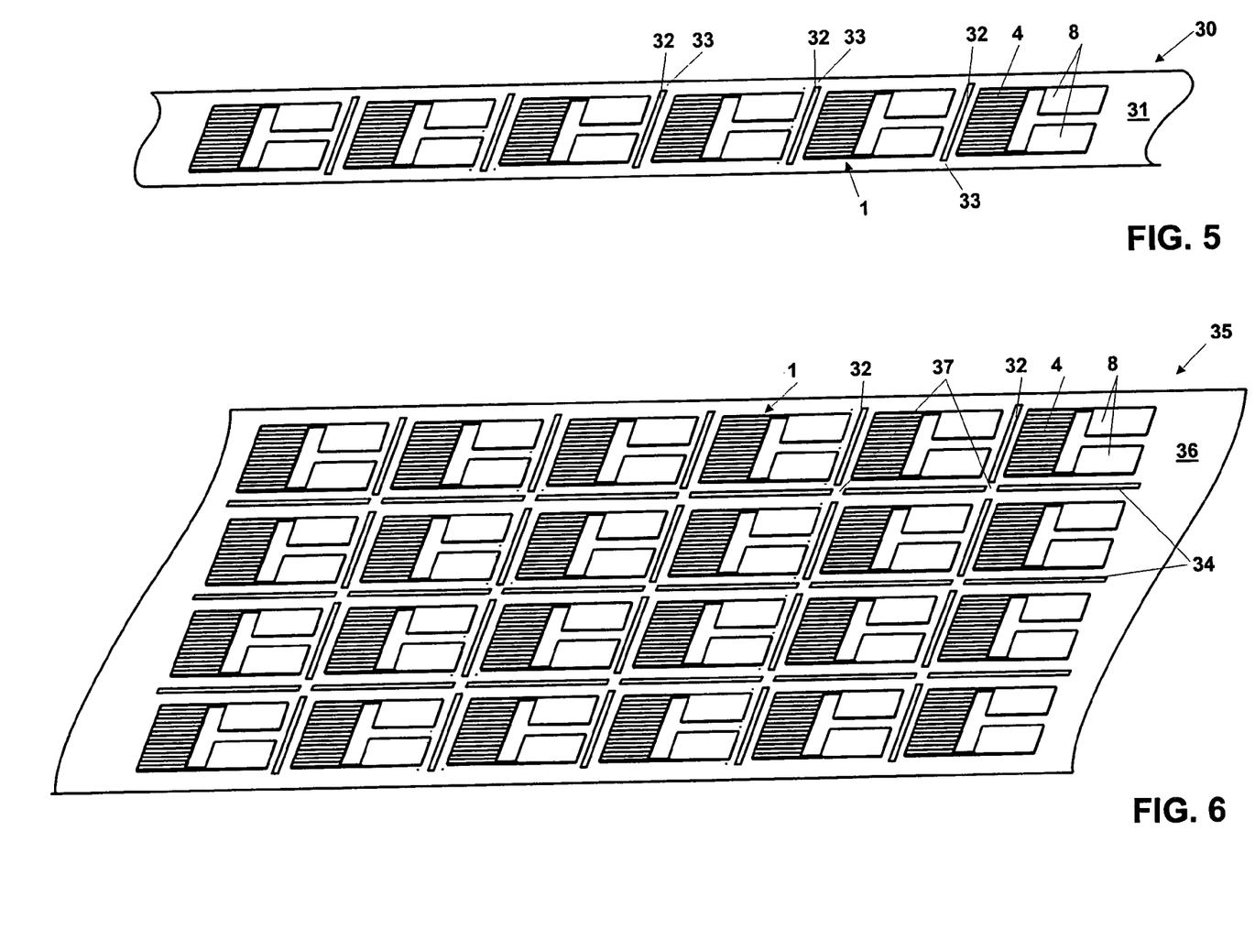
FIG. 5 illustrates an exemplary array of strain gauges in a row with slits in the carrier material between neighboring strain gauges.
FIG. 6 illustrates an exemplary array of strain gauges extending over a two-dimensional area, with slits in the carrier material between neighboring strain gauges.

A possible way of applying a surface-smoothing layer 3 and an inorganic protective coating 2, 12 to at least a large part of the lateral edge surfaces of strain gauges 1 that hang together in a row or a two-dimensional array will now be described with reference to FIGS. 5 and 6. FIG. 5 shows a single-row array 30 of strain gauges 1. Between the resistor patterns 4 with their connector electrodes 8, the carrier substrate 31 of the single-row array 30 is perforated by narrow slits 32 that run transverse to the lengthwise dimension of the single-row array 30, with the slits ending short of the entire width of the carrier substrate 31 of the single-row array 30. The slits 32 in the carrier substrate 31 can be made by different methods such as water-jet cutting, laser cutting, or by die punch cutting after the resistor patterns 4 and the connector electrodes 8 are in place. This step is performed prior to coating the single-row array 30 with the inorganic protective coating 2, 12. As a result, the protective coating 2, 12 will now also cover the lateral edge surfaces of the strain gauge except for the connecting portions 33 of the carrier substrate 31 which are left in place during the coating process but are dimensioned as narrow as possible and which are subsequently cut apart when the individual strain gauges are separated from each other.

FIG. 6 shows an exemplary two-dimensional array 35 of strain gauges 1 where the carrier substrate 36 of the two-dimensional array 35 is perforated in the spaces between the individual resistor patterns 4 with their connector electrodes 8 by slits 32 aligned one way and perpendicularly aligned slits 34 so that the substrate hangs together only by four connecting portions 37 around of each strain gauge 1. The slits 32, 34 are made at those locations of a carrier substrate 5 where the two-dimensional array 35 is subsequently broken up when the individual strain gauges 1 are separated from each other. However, the array of the slits can be modified in many ways, for example so that the individual resistor patterns 4 with their connector electrodes 8 are partly surrounded by continuous slits forming right angles with only two or three connecting portions of the substrate 36 left in place around each strain gauge. Of course, the strain gauges 1 could also be connected to each other through more than four connecting portions.

The important point is to minimize the areas where the carrier substrate 31, 36 is tied together by the connecting portions 33, 37, i.e., to make the surface areas of the connecting portions 33, 37 on the one hand small enough to maximize the part of the edges of a strain gauge 1 that can be covered by the protective coating 2, 12 and on the other hand to ensure that the carrier substrate 31, 36 hangs together with sufficient strength so that the single-row array 30 or two-dimensional array 35 of strain gauges 1 can be safely handled. It has been shown that the measures just described are very effective in improving the resistance to moisture penetration in comparison to strain gauges in single-row and two-dimensional arrays made with the existing state of the art and that the sensitivity of a force-measuring cell equipped with strain gauges 1 according to exemplary embodiments is decisively improved.

The width of a slit 32, 34 can be appropriately selected so that on the one hand not too much substrate material is lost between the individual strain gauges 1 and on the other hand to ensure a sufficient coverage of the edge surfaces of a strain gauge 1 in the process of applying the coating materials. A width of about 0.5 mm can be given as a general guideline.

Prior to the start of the coating process, i.e., before applying the surface-smoothing layer 3, it is an exemplary practice to subject the carrier substrate 5 with the resistor track 4 of a strain gauge 1 to a cleaning process in which the surface is pretreated by means of chemical or physical cleaning methods, in particular a plasma-cleaning method. A cleaning process of this type can likewise be used on the surface-smoothing layer 3 after the latter has been deposited and before the inorganic protective coating 1, 12 is put in place.

Figure 7:
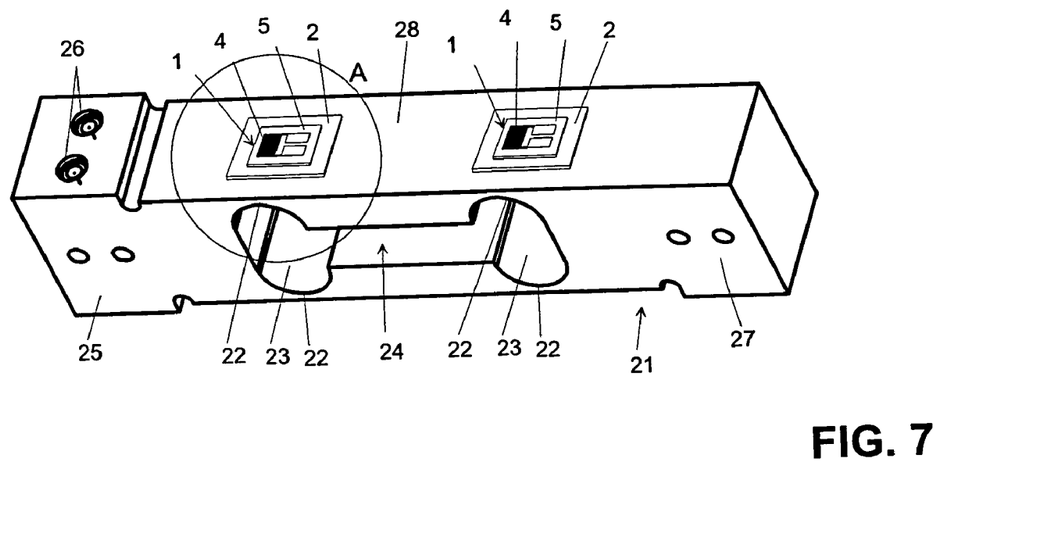
FIG. 7 represents a three-dimensional view of an exemplary deformable body of a weighing cell with strain gauges installed on the thin material portions that form the bending pivots.

FIG. 7 illustrates the deformable body 21 of a weighing cell with four elastic bending zones 22 arranged at the corner points of a parallelogram. The bending zones are formed by the curved contours of widened end portions 23 of a cutout 24 at the center of the monolithic deformable body 21. The load receiver 25 of the deformable body 21, which is shown in the left-hand part of FIG. 7, is vertically movable. If the force measuring cell is used within the area of weighing technology, and a load is put on a weighing pan which is not shown in the drawing but can be fastened by means of several screws to the tapped holes 26 of the load receiver 25, the load receiver 25 is moved vertically downward in relation to a stationary part 27 (shown in the right-hand part of the drawing) of the deformable body 21 as the bending zones 22 undergo a deformation. This deformation is measured by means of strain gauges 1 that are adhesively bonded to the top side 28 of the deformable body 21 at the bending zones 22. The strain gauges 1 have a strain-sensitive resistor track 4 which is arranged, for example, in the shape of a meandering pattern on a carrier substrate 5. Strain gauges can be arranged not only at the bending zones 22 on the top side 28 of the deformable body 21 but also at the bending zones on the bottom side of the deformable body 21 which is not visible in the drawing. The strain gauges 1 are provided with a protective coating 2, 12 against penetrating moisture, i.e., water, solvents or gases. The protective coating 2, 12, whose configuration, production process and function has been explained above in the context of FIGS. 1 to 4, and also the underlaid surface-smoothing polymer layer 3 are drawn here as transparent layers in order to make the strain gauges 1 recognizable. However, there is no need for the coating layers 2, 3, 12 to be transparent to light in their actual embodiments.

In the embodiment shown in FIG. 7, the protective coating 2, 12 has been applied directly to the strain gauge 1 after it has already been installed on the deformable body 21. This makes it possible to cover the strain gauge 1 in its entirety, i.e., the carrier substrate 5 and the resistor track 4 and even a surrounding area of the deformable body 21 and to thereby provide a complete seal against the penetration of moisture. In particular, the coating also covers the epoxy resin which is often used as an adhesive bonding agent and which was used here to install the strain gauge 1 on the deformable body 21, spreading slightly outside the border of the strain gauge 1 (see FIG. 8). This means that moisture-related influences of the bonding material which affect the weighing performance are likewise prevented. By completely covering the borders and edges of the strain gauge 1 with the inorganic protective coating 2, 12, the effects that could be caused by the possible entry of moisture at the borders and edges are also avoided. In this manner, the rate of change of the aforementioned measurement characteristics of a force-measuring cell which are affected by changes of the humidity in the ambient atmosphere, i.e., the sensitivity, the stability of the zero point, and the creep properties, can be reduced in magnitude by a factor of $10^2$ to $10^6$. Consequently, these parameters will in most cases be practically unaffected by changes in ambient atmospheric humidity over the lifetime of a force-measuring cell.

Figure 8:
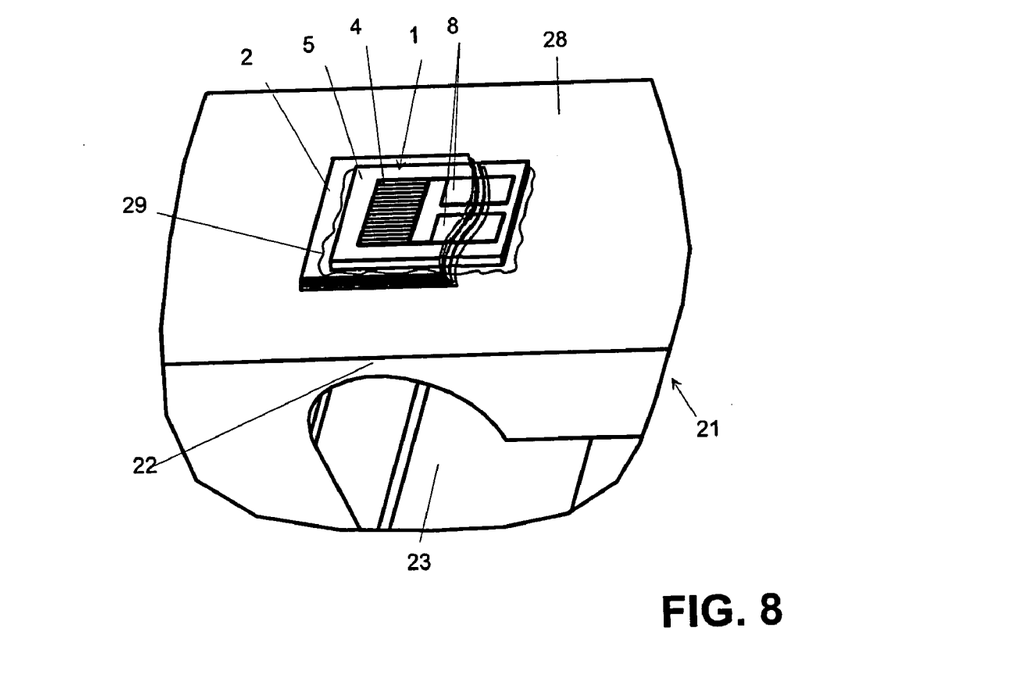
FIG. 8 represents an enlarged three-dimensional view of the part of the deformable body that is framed by the circle A in FIG. 7, carrying a strain gauge that is provided with a multilayered coating.

FIG. 8 gives an enlarged view of the part of the deformable body 21 that is framed by the circle A in FIG. 7. As in FIG. 7, the strain gauge 1 that is installed at the bending zone 22 is illustrated. In addition, FIG. 8 shows the multi-layered inorganic coating 2 with the surface-smoothing polymer layer 3 covering the strain gauge 1 and a part of the topside 28 of the deformable body 21, and also covering in particular the aforementioned adhesive layer 29. For the sake of clarity, the inorganic protective coating 2 is again drawn as a transparent coating and cut open on the side that faces to the right in the drawing. Also visible are the connector electrodes 8 of the meander-shaped resistor track 4. Of course, the connector electrodes 8 have to remain accessible for the connection of the sensor-bridge circuit (not shown here) even after a protective coating 2 has been applied. Accordingly, appropriate measures can be taken.

As the coating is in this case applied to a strain gauge 1 that is already installed on the deformable body 21 of a force-measuring cell, a vapor deposition in an air atmosphere can be used as a particularly cost-effective coating technique. In a coating method of this kind which is known as combustion chemical vapor deposition (CCVD), the vapor of a substance that is, for example, in a dissolved state is heated in a gas flame, where the substance undergoes a chemical reaction before it settles on a substrate that is positioned near the flame. Other possible deposition methods that should be mentioned in this context include the technique of plasma-enhanced chemical vapor deposition (PECVD) or the technique of plasma-induced chemical vapor deposition (PICVD).

The plasma deposition methods allow the deposition of surface-conforming coating layers, also referred to as conformal coating layers, because the plasma reaches all of the surface areas to be coated independent of their orientations within the deposition apparatus. With a suitable selection of the deposition process parameters, in particular the excitation frequency and its variation as a function of time, it is possible to produce protective coatings 2, 12 or layers 6, 7 of a multilayered coating 2 with a low incidence of stress, a fact that contributes to a reduced risk of delamination, in particular a delamination of individual layers 6, 7 in a multilayered coating 2.

Following is a more specific description of an example of a production process used for a protective coating 12 of silicon oxynitride. After the surface-smoothing layer 3 of an inorganic-organic hybrid polymer has been applied by means of a tampon-printing method, the strain gauge is put into an apparatus for the coating by means of PECVD with $SiH_2$ diluted in $N_2$, $NH_3$ and $N_2O$ as process gases. The formation of nitride is promoted by the presence of the process gases $SiH_4$ diluted in $N_2$ and $NH_3$. With a progressive increase in the inflow of $N_2O$, silicon oxynitride is formed, whereupon the supply of $NH_3$ is cut down while the inflow of is increased further.

By reversing this step und subsequently repeating the cycle, it is possible to either produce a multi-layered coating with soft transitions between the layers, while a procedure with an abrupt cut-off of the $NH_3$ supply during a continuing undiminished inflow of $N_2O$ and vice versa allows the production of multilayered coatings with almost discontinuous transitions.

The strain gauges 1 that are provided with an inhomogeneous inorganic protective coating 2, 12 which is underlaid with a surface-smoothing layer 3 have been described and illustrated in exemplary embodiments. However, based on the teachings disclosed herein, those skilled in the pertinent art will be able to realize further embodiments.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Strain gauge comprising:
   a strain-sensitive electrical resistor track;
   connector electrodes for contacting the resistor track arranged on a carrier substrate; and
   a protective coating having a thickness and comprising inorganic materials covering at least part of the carrier substrate and/or of the resistor track and/or of the connector electrodes, wherein the inorganic materials of the protective coating are inhomogeneous along the thickness of the coating, and the protective coating is underlaid with a surface-smoothing polymer layer which evens out rough surface portions of an area to be coated, wherein a layer thickness of the surface-smoothing layer is at least equal to the thickness of a protective coating.

2. Strain gauge according to claim 1, wherein the protective coating consists of inorganic materials.

3. Strain gauge according to claim 1, wherein the protective coating is arranged as a conformal coating on the surface-smoothing layer.

4. Strain gauge according to claim 1, wherein the protective coating is configured as a multilayered coating with an alternating sequence of layers of different inorganic materials, and/or an alternating sequence of different stoichiometric compositions of an inorganic material consisting of at least two components, and/or an alternating sequence of variations in structural parameters of an inorganic material.

5. Strain gauge according to claim 1, wherein the protective coating comprises a sequence of silicon nitride layers and further layers, wherein the further layers consist of oxides, carbides, fluorides, or mixtures thereof.

6. Strain gauge according to claim 5, wherein the further layers consist of titanium oxide, tantalum oxide, zirconium oxide, hafnium oxide, aluminum oxide, silicon carbide, titanium fluoride, or silicon oxide.

7. Strain gauge according to claim 1, wherein the protective coating is configured with a continuous variation of one or more parameters, wherein said parameters include chemical composition of the coating material, and wherein said continuous variation can be a monotonic variation or a periodic variation over a range of the coating thickness.

8. Strain gauge according to claim 1, wherein the surface-smoothing polymer layer consists of an acrylate polymer or of an inorganic-organic hybrid polymer.

9. Strain gauge according to claim 1, wherein a cover layer of silicone or of a polymer material covers the inorganic protective coating.

10. Single-row array or two-dimensional array of strain gauges configured according to claim 1, wherein the carrier substrate of the single-row array or two-dimensional array is perforated by an arrangement of slits which allow lateral edge surfaces of the carrier substrate in areas of the slits to be covered by the surface-smoothing layer and the protective coating.

11. Single-row array or two-dimensional array according to claim 10, wherein the arrangement of slits consists of slits that extend along sides of a strain gauge, wherein each of the slits extends over nearly an entire length of a side of a strain gauge.

12. Force-measuring cell with a deformable body and with at least one strain gauge configured according to claim 1, installed on the deformable body, wherein a part of the protective coating and of the surface-smoothing polymer undercoating layer extend beyond the at least one strain gauge and cover at least a part of the deformable body.

13. Force-measuring cell according to claim 12, wherein the part of the protective coating and of the surface smoothing polymer undercoating layer cover surface portions of the deformable body that border on the strain gauge.

14. The strain gauge according to claim 1, wherein the inorganic materials are electrically insulating materials.

15. The strain gauge according to claim 1, wherein the protective coating defines a planar area corresponding to the area of the coating covering at least part of the substrate and/or of the resistor track and/or of the connector electrodes, wherein the inorganic materials of the protective coating are inhomogeneous along the thickness over at the entire planar area.

16. Method of producing a protective coating on an individual strain gauge or on a single-row array or two-dimensional array of strain gauges, comprising:
    depositing a surface-smoothing polymer layer on at least a part of a carrier substrate and/or on a resistor track and/or connector electrodes of a strain gauge; and
    depositing a thin inorganic protective coating on the surface-smoothing polymer layer, wherein deposition process parameters are varied such that an inorganic protective coating is formed which is inhomogeneous along a thickness of the protective coating.

17. Method according to claim 16, comprising:
    pretreating a surface of a strain gauge and/or of the deformable body and/or of the surface-smoothing polymer layer prior to the deposition process by chemical or physical cleaning methods.

18. Method according to claim, 17, wherein a plasma-cleaning method is used for the pretreating.

19. Method of producing a protective coating on a at least one strain gauge installed on a deformable body of a force measuring cell, said strain gauge having a strain-sensitive electrical resistor track and connector electrodes for contacting the resistor track arranged on a carrier substrate, the method comprising:
    depositing a surface-smoothing polymer layer on at least a part of the carrier substrate and/or the resistor track and/or the connector electrodes and on the deformable body; and
    depositing a thin inorganic protective coating on the surface-smoothing polymer layer, wherein the deposition process parameters are varied such that an inorganic protective coating is formed which is inhomogeneous along a thickness of the protective coating.

20. Method according to claim 19, comprising:
    pretreating a surface of a strain gauge and/or of the deformable body and/or of the surface-smoothing polymer layer prior to the deposition process by chemical or physical cleaning methods.

21. Method according to claim, 20, wherein a plasma-cleaning method is used for the pretreating.

* * * * *